(12) United States Patent
Krithivasan et al.

(10) Patent No.: US 8,243,100 B2
(45) Date of Patent: Aug. 14, 2012

(54) SYSTEM AND METHOD TO PERFORM FAST ROTATION OPERATIONS

(75) Inventors: Shankar Krithivasan, Austin, TX (US);
Erich James Plondke, Austin, TX (US);
Lucian Codrescu, Austin, TX (US);
Mao Zeng, Austin, TX (US); Remi Jonathan Gurski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 896 days.

(21) Appl. No.: 12/146,825

(22) Filed: Jun. 26, 2008

(65) Prior Publication Data
US 2009/0327667 A1 Dec. 31, 2009

(51) Int. Cl.
*G09G 5/00* (2006.01)
(52) U.S. Cl. ......... 345/658; 345/649; 345/656; 345/659
(58) Field of Classification Search .................. 345/649, 345/656, 658, 659
See application file for complete search history.

(56) References Cited

U.S. PATENT DOCUMENTS

| | | | |
|---|---|---|---|
| 5,019,968 A | 5/1991 | Wang et al. | |
| 5,202,847 A * | 4/1993 | Bolton et al. | 708/401 |
| 5,317,753 A | 5/1994 | Kuenemund et al. | |
| 5,737,253 A | 4/1998 | Madisetti et al. | |
| 5,973,664 A * | 10/1999 | Badger | 345/659 |
| 2002/0080141 A1* | 6/2002 | Imai et al. | 345/519 |
| 2006/0154625 A1* | 7/2006 | Malone et al. | 455/118 |
| 2006/0200510 A1 | 9/2006 | Wang et al. | |
| 2007/0073796 A1 | 3/2007 | Meilhac et al. | |
| 2007/0130241 A1 | 6/2007 | Bredehoft | |
| 2007/0164822 A1* | 7/2007 | Murthy et al. | 330/278 |
| 2007/0266070 A1 | 11/2007 | Sung et al. | |

FOREIGN PATENT DOCUMENTS

| | | |
|---|---|---|
| EP | 1394673 A1 | 3/2004 |
| WO | WO9827663 A2 | 6/1998 |

OTHER PUBLICATIONS

International Search Report and Written Opinion—PCT/US2009/047671, International Search Authority Oct. 1, 2009—European Patent Office.

* cited by examiner

*Primary Examiner* — Jeffrey Chow
(74) *Attorney, Agent, or Firm* — Peter Michael Kamarchik; Nicholas J. Pauley; Jonathan T. Velasco

(57) ABSTRACT

Systems and methods to perform fast rotation operations are disclosed. In a particular embodiment, a method includes executing a single instruction. The method includes receiving first data indicating a first coordinate and a second coordinate, receiving a first control value that indicates a first rotation value selected from a set of ninety degree multiples, and writing output data corresponding to the first data rotated by the first rotation value.

26 Claims, 8 Drawing Sheets

SYSTEM AND METHOD TO PERFORM FAST ROTATION OPERATIONS

I. FIELD

The present disclosure is generally related to performing fast rotation operations.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks.

Receiving data communicated over a wireless link includes a data decoding function. The data decoding function may involve one or more vector rotation operations that use multiplication operations. For example, wireless data may be encoded as a series of symbols including an angular displacement between vectors having complex values, such as an in-phase component and a quadrature component. Retrieving data from such symbols may require rotating the vectors, such as to compensate for an accumulated phase during decoding. Such vector operations may consume limited processing resources, particularly at a portable device.

III. SUMMARY

Systems and methods to perform fast vector rotation operations are disclosed. Vectors identified by endpoint coordinate data may be rotated about a coordinate origin by a degree of rotation or angular displacement specified via one or more control values. The disclosed embodiments may operate in conjunction with encoding or decoding wireless data, such as at a modem device or processor, or in conjunction with other applications.

In a particular embodiment, a method is disclosed that includes executing a single vector rotation instruction at a processor. The single vector rotation instruction includes receiving first data indicating a first coordinate and a second coordinate, receiving a first control value that indicates a first rotation value selected from a set of ninety degree multiples, and writing output data to a data storage element, where the output data corresponds to the first data rotated by the first rotation value.

In another particular embodiment, a processor is disclosed that includes means to selectively swap first coordinate data and second coordinate data in response to a control value. The processor also includes means to negate the first coordinate data to generate first negated coordinate data and to negate the second coordinate data to generate second negated coordinate data. The processor further includes means to selectively output the first coordinate data or the first negated coordinate data and to selectively output the second coordinate data or the second negated coordinate data in response to the control value. The control value indicates a degree of rotation of a vector represented by the first coordinate data and the second coordinate data.

In a particular embodiment, a system is disclosed that includes a modem that is adapted to perform fast vector rotation operations. The system includes a transceiver configured to be coupled to an antenna. The modem is coupled to receive wireless signal data from the transceiver. The wireless signal data includes symbol data which may correspond to coordinate locations, such as positions of vector endpoints. The modem includes a crossbar device configured to selectively swap first coordinate data and second coordinate data associated with the symbol data in response to a control value. The modem also includes a vector adder device configured to negate an output of the crossbar device. The modem further includes a multiplexer coupled to selectively output either an output of the vector adder device or the output of the crossbar device in response to the control value. The control value indicates a degree of rotation of a first vector represented by the first coordinate data and the second coordinate data.

In another particular embodiment, a processor instruction that is executable by a processor to perform a vector rotation in a single execution cycle is disclosed. The processor instruction includes an instruction name and a first field that includes a first coordinate and a second coordinate. The processor instruction also includes a second field that includes a first control value that indicates a first amount to rotate the first and second coordinate data. The processor upon execution of the processor instruction stores rotated data into a memory. The rotated data corresponds to the first and second coordinate data rotated by the first amount indicated by the first control value.

One particular advantage provided by the disclosed embodiments is higher speed decoding of wireless data enabled by fast vector rotation operations. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
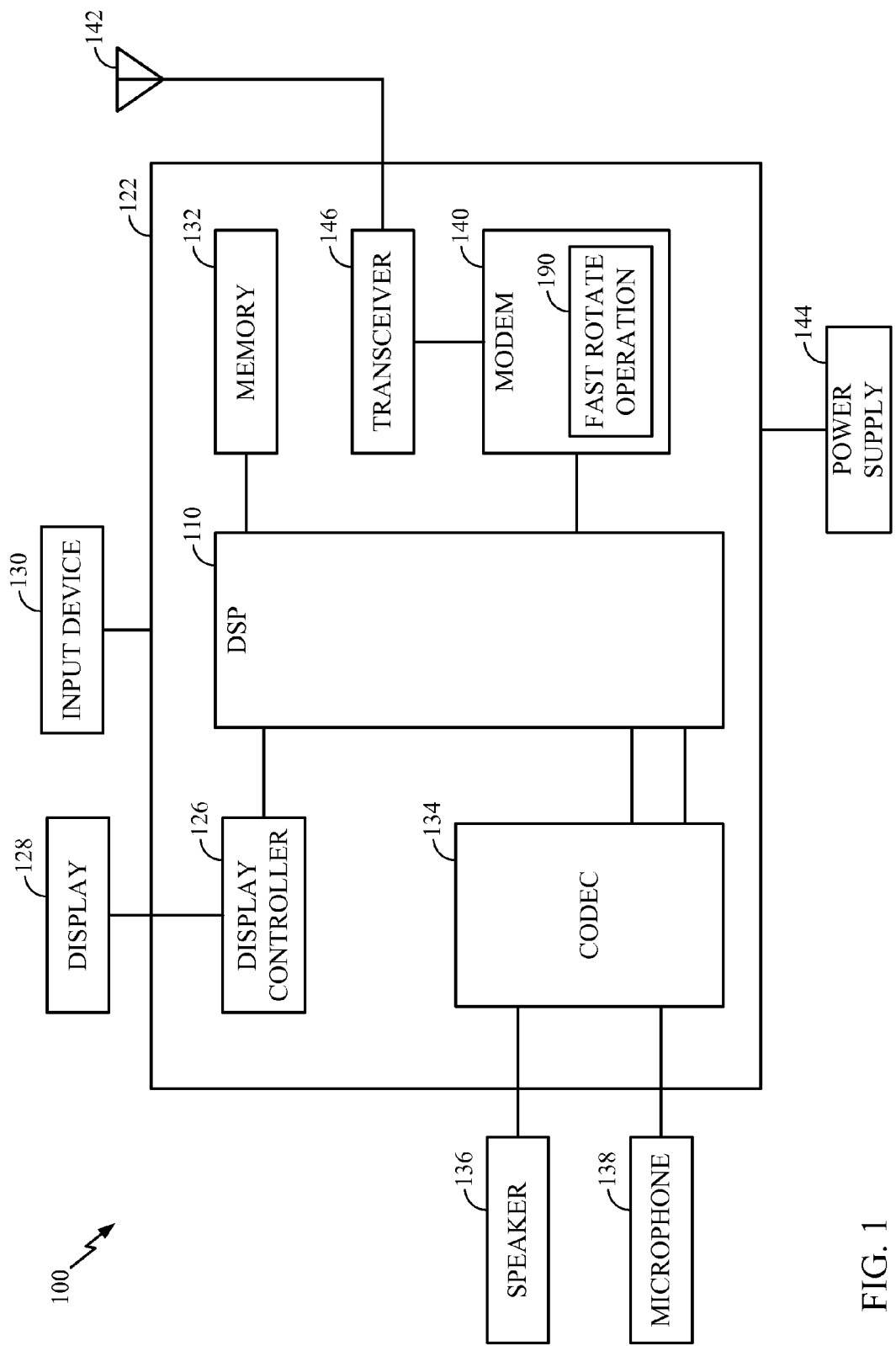
FIG. 1 is a block diagram of a particular illustrative embodiment of a portable communication device that is configured to perform a fast vector rotate operation.

Referring to FIG. 1, a block diagram of a particular illustrative embodiment of an electronic device that is configured to perform a fast vector rotation operation is depicted and generally designated 100. The device 100 includes a processor, such as a digital signal processor (DSP) 110, coupled to a memory 132 and also coupled to a modem 140 that is configured to perform a fast vector rotation operation 190.

FIG. 1 also shows a display controller 126 that is coupled to the digital signal processor 110 and to a display 128. A coder/decoder (CODEC) 134 can also be coupled to the digital signal processor 110. A speaker 136 and a microphone 138 can be coupled to the CODEC 134.

The modem 140 can be coupled to a transceiver 146. The transceiver 146 may be configured to be coupled to a wireless antenna 142. The transceiver 146 may be configured to generate coordinate data, such as symbol phase data, corresponding to a wireless signal that is received when the transceiver 146 is coupled to the antenna 142. The modem 140 is configured to apply the fast vector rotation operation 190 to coordinate data received from the transceiver 146 as part of a decoding process to retrieve encoded data from the wireless signal.

For example, symbol phase data may be expressed as a vector having one end at a coordinate origin, such as at the coordinates (0,0) in an (x,y) coordinate system and may be described by the coordinates of the other end of the vector, such as the coordinates (1,1) for a vector at a forty-five degree angle from the positive x axis. As illustrative examples, performing a vector rotation of the (1,1) vector by a degree of rotation, i.e., an angular displacement, of ninety degrees within the coordinate plane results in the rotated vector (−1, 1). Performing a vector rotation of the (1,1) vector by one hundred eighty degrees results in the rotated vector (−1,−1) Performing a vector rotation of the (1,1) vector by two hundred seventy degrees, results in the rotated vector (1,−1).

In a particular embodiment, the DSP 110, the display controller 126, the memory 132, the CODEC 134, the modem 140, and the transceiver 146 are included in a system-in-package or system-on-chip device 122. In a particular embodiment, an input device 130 and a power supply 144 are coupled to the system-on-chip device 122. Moreover, in a particular embodiment, as illustrated in FIG. 1, the display 128, the input device 130, the speaker 136, the microphone 138, the wireless antenna 142, and the power supply 144 are external to the system-on-chip device 122. However, each of the display 128, the input device 130, the speaker 136, the microphone 138, the wireless antenna 142, and the power supply 144 can be coupled to a component of the system-on-chip device 122, such as an interface or a controller.

During operation, a wireless signal including encoded data may be received at the antenna 142 and corresponding coordinate data may be provided to the modem 140 via the transceiver 146. For example, the coordinate data may represent X and Y coordinates of a vector. The modem 140 may perform rotations of the coordinate data using the fast vector rotate operation 190 as a part of a decoding process. The fast vector rotate operation 190 may enable multiple coordinate rotations each processing cycle of the modem 140, enabling high speed decoding of data. In addition, the fast vector rotate operation 190 may enable coordinate rotations to be performed without using multiplications or table lookups, reducing power consumption of the decoding process.

In a particular embodiment, the modem 140 includes a pipelined processor that is configured to execute an instruction to perform the fast vector rotate operation 190 to perform multiple vector coordinate rotations during a single processor execution cycle. For example, the modem 140 may receive wireless signal data including symbol data that includes a first vector identified by first coordinates and a second vector identified by second coordinates from the transceiver 146. The modem 140 may be configured to perform concurrent rotation operations to the first vector and to the second vector during a single execution cycle by executing a single processor instruction.

Figure 4:
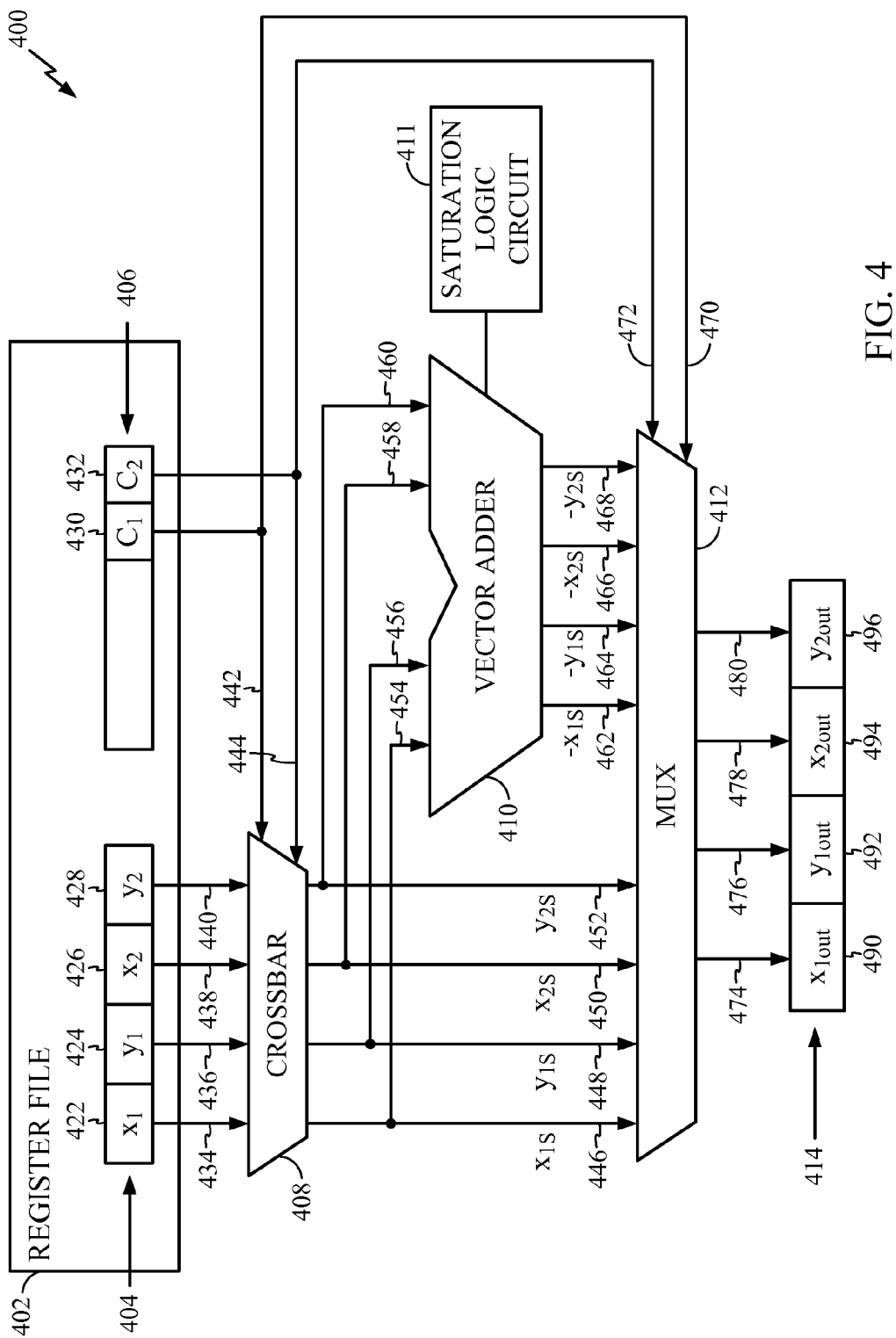
FIG. 4 is a block diagram of a particular illustrative embodiment of a system to generate fast vector rotation operations.

For example, in an illustrative embodiment, the modem 140 includes a pipelined processor having an execution unit including the system 400 of FIG. 4, i.e., including a crossbar device configured to selectively swap first coordinate data and second coordinate data of a first vector in response to a control value, a vector adder device configured to negate an output of the crossbar device, and a multiplexer coupled to selectively output either an output of the vector adder device or the output of the crossbar device in response to the control value. The control value may indicate a desired degree of rotation (e.g., a multiple of ninety degrees) of the first vector represented by the first coordinate data and the second coordinate data.

In a particular embodiment, the modem 140 may not include dedicated hardware components and circuitry, and may instead be a modem application that is executed at the processor 110, such as a processing thread of an interleaved multithreaded pipelined processor, where the fast vector rotate operation 190 is executed to perform multiple vector coordinate rotations during a single processing cycle of the processor 110. In yet another embodiment, the fast vector rotation operation 190 may be performed by dedicated hardware, firmware, one or more other processors, or any combination thereof.

Figure 2:
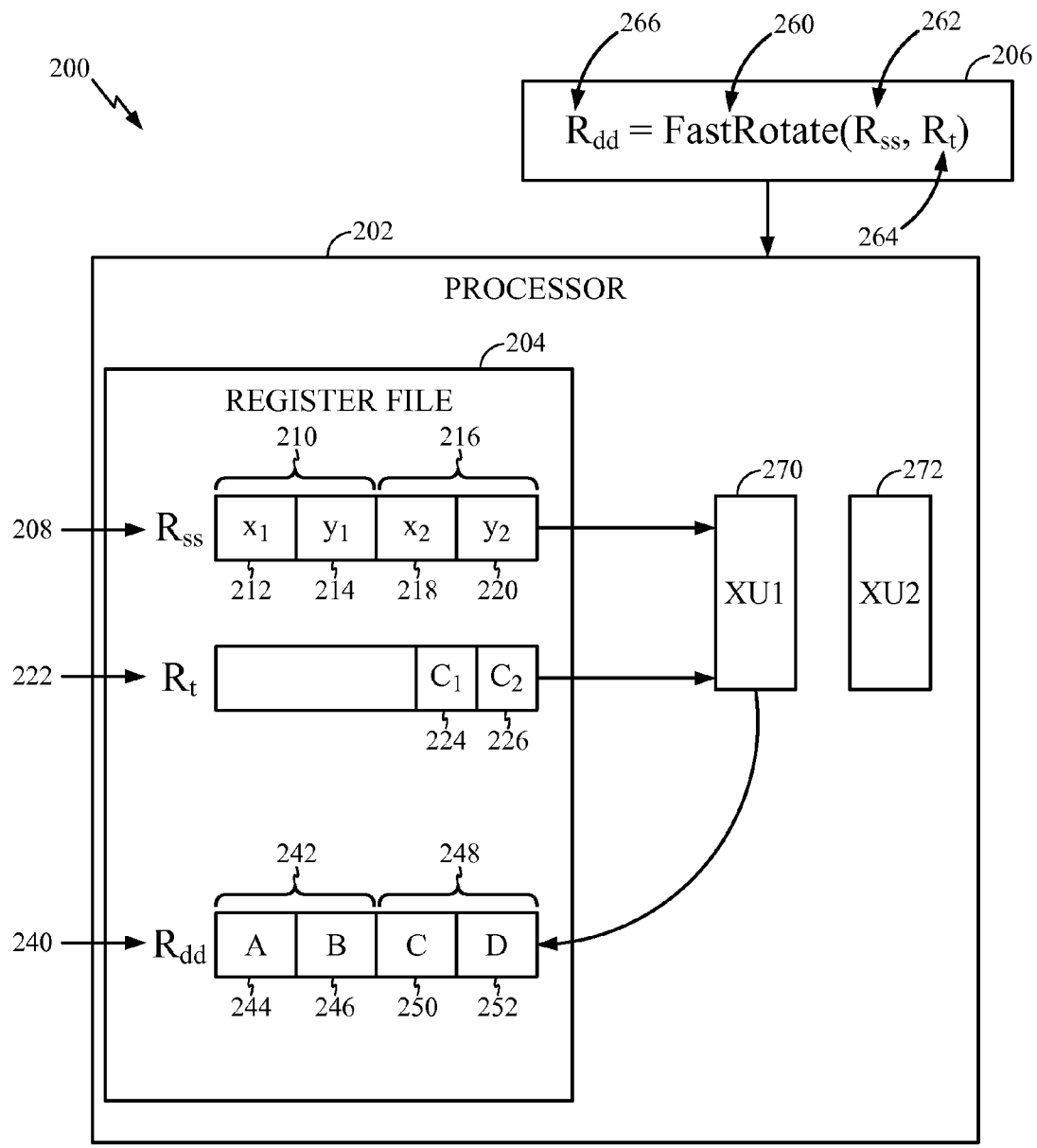
FIG. 2 is a block diagram of a particular illustrative embodiment of a system to execute a fast vector rotation instruction.

Referring to FIG. 2, a system to execute a fast vector rotation operation instruction is depicted and generally designated 200. The system 200 includes a processor 202 including a register file 204. The processor 202 is configured to receive a rotation instruction 206. In a particular embodiment, the system 200 is included in the modem 140 of FIG. 1, and the rotation instruction 206 corresponds to a portion of the fast vector rotate operation 190 depicted in FIG. 1.

In a particular embodiment, the rotation instruction 206 is a processor instruction that is executable by the processor 202 to perform a vector rotation in a single execution cycle. The rotation instruction 206 includes an instruction name 260, depicted as the name FastRotate. The rotation instruction 206 also includes a first field ($R_{ss}$) 262 and a second field ($R_t$) 264. The rotation instruction 206 returns a value (e.g., a rotated vector resulting from executing the vector rotation operation) to an address ($R_{dd}$) 266.

In a particular embodiment, the first field $R_{ss}$ 262 includes an address corresponding to a first register 208 of the register file 204. The second field Rt 262 includes an address corresponding to a second register 222 of the register file 204. The return address $R_{dd}$ 266 corresponds to a third register 240 of the register file 204.

In a particular embodiment, the processor 202 is configured to access first data 210 and a first control value 224 ($C_1$) in response to receiving the rotation instruction 206. The first data 210 (e.g., a first vector) may include a first coordinate ($x_1$) 212 and a second coordinate ($y_1$) 214 of a vector from the source register $R_{ss}$ 208. Upon execution of the rotation instruction 206, the processor 202 stores rotated data 242 into a memory, such as the third register 240 of the register file 204. The rotated data 242 corresponds to the first data 210 rotated by a first amount that is indicated by the first control value 224, and the rotated data 242 may be stored as a set of rotated coordinates A 244 and B 246 at the destination register $R_{dd}$ 240. In a particular embodiment, the processor 202 includes multiple execution units 270 and 272, that may each be adapted to perform the rotation instruction 206 during a single processing cycle of the processor 202.

In a particular embodiment, the processor 202 is further configured, upon execution of the rotation instruction 206, to read second data 216 (e.g., a second vector) from the first register 208, the second data 216 including a third coordinate ($x_2$) 218 and a fourth coordinate ($y_2$) 220. The processor 202 may be further configured to read a second control value ($C_2$) 226 from the second register 222. The second control value 226 indicates a second amount to rotate the second data 216. The processor 202 may return second rotated data 248 to the third register 240 of the register file 204. The second rotated data 248 includes rotated coordinate data, such as a set of coordinates C 250 and D 252, corresponding to the second data 216 rotated by the second amount indicated by the second control value 226.

In a particular embodiment, the processor 202 is configured to read the first data 210 and the second data 216 concurrently upon execution of the rotation instruction 206. The processor 202 may be further configured to read both the first control value 224 and the second control value 226 concurrently with the first and second data 210 and 216, respectively. The processor 202 may be configured to perform a first rotation operation on the first data 210 in accordance with the first control value 224 to generate the rotated data 242, as well as performing the second rotation on the second data 216 in accordance with the second control value 226 to generate the second rotated data 248. The rotated data 242 and the second rotated data 248 may be written concurrently to the register file 204, at the third register 240 having an address indicated by the return address 266 of the rotation instruction 206.

Reading the first data 210, the second data 216, the first control value 224, and the second control value 226, as well as generating and storing the rotated data 242 and the second rotated data 244, may be performed in a single processor execution cycle using a single execution unit 702 or 272. Thus, the system 200 enables the processor 202 to perform multiple vector rotations per execution cycle of the processor 202. For example, the first data 210 and the second data 216 may correspond to vectors associated with sequential symbol values received at a modem from a transceiver, such as in connection with a quadrature decode cycle of a wireless receiver, as a non-limiting, illustrative example.

In a particular embodiment, execution of the rotation instruction may be performed according to rotation logic illustrated for a pseudocode instruction vcrotate as indicated below:

```
Rdd=vcrotate(Rss,Rt)
tmp = Rt[1:0];
if (tmp == 0) {
    Rdd.h[0]=Rss.h[0];
    Rdd.h[1]=Rss.h[1];
} else if (tmp == 1) {
    Rdd.h[0]=Rss.h[1];
    Rdd.h[1]=sat_16(-Rss.h[0]);
} else if (tmp == 2) {
    Rdd.h[0]=sat_16(-Rss.h[1]);
    Rdd.h[1]=Rss.h[0];
} else {
    Rdd.h[0]=sat_16(-Rss.h[0]);
    Rdd.h[1]=sat_16(-Rss.h[1]);
};
tmp = Rt[3:2];
if (tmp == 0) {
    Rdd.h[2]=Rss.h[2];
    Rdd.h[3]=Rss.h[3];
} else if (tmp == 1) {
    Rdd.h[2]=Rss.h[3];
    Rdd.h[3]=sat_16(-Rss.h[2]);
} else if (tmp == 2) {
    Rdd.h[2]=sat_16(-Rss.h[3]);
    Rdd.h[3]=Rss.h[2];
```
-continued
```
} else {
    Rdd.h[2]=sat_16(-Rss.h[2]);
    Rdd.h[3]=sat_16(-Rss.h[3]);
};
```

In the above pseudocode, Rss.h[n] refers to the $n^{th}$ halfword of the source register Rss. For example, Rss may include a sixty-four bit value having four sixteen-bit halfwords, the sixty-four bit value corresponding to first x and y data in the first and second halfwords Rss.h[0] and Rss.h[1], respectively, and second x and y data in the third and fourth halfwords Rss.h[2] and Rss.h[3], respectively. Rt refers to a register storing control values, including a first rotation indicator at bits [1:0] and a second rotation indicator at bits [3:2]. Each rotation indicator is represented by two bits representing one of a set of four values. A "zero" control value represents a zero degree rotation. A "one" control value represents a negative ninety, or two hundred seventy, degree rotation. A "two" control value represents a ninety degree rotation. A "three" control value represents a one hundred eighty degree rotation. The function sat_16 corrects a saturation condition resulting from negating a zero value, and Rdd represents a destination register containing four sixteen-bit halfwords.

Figure 3:
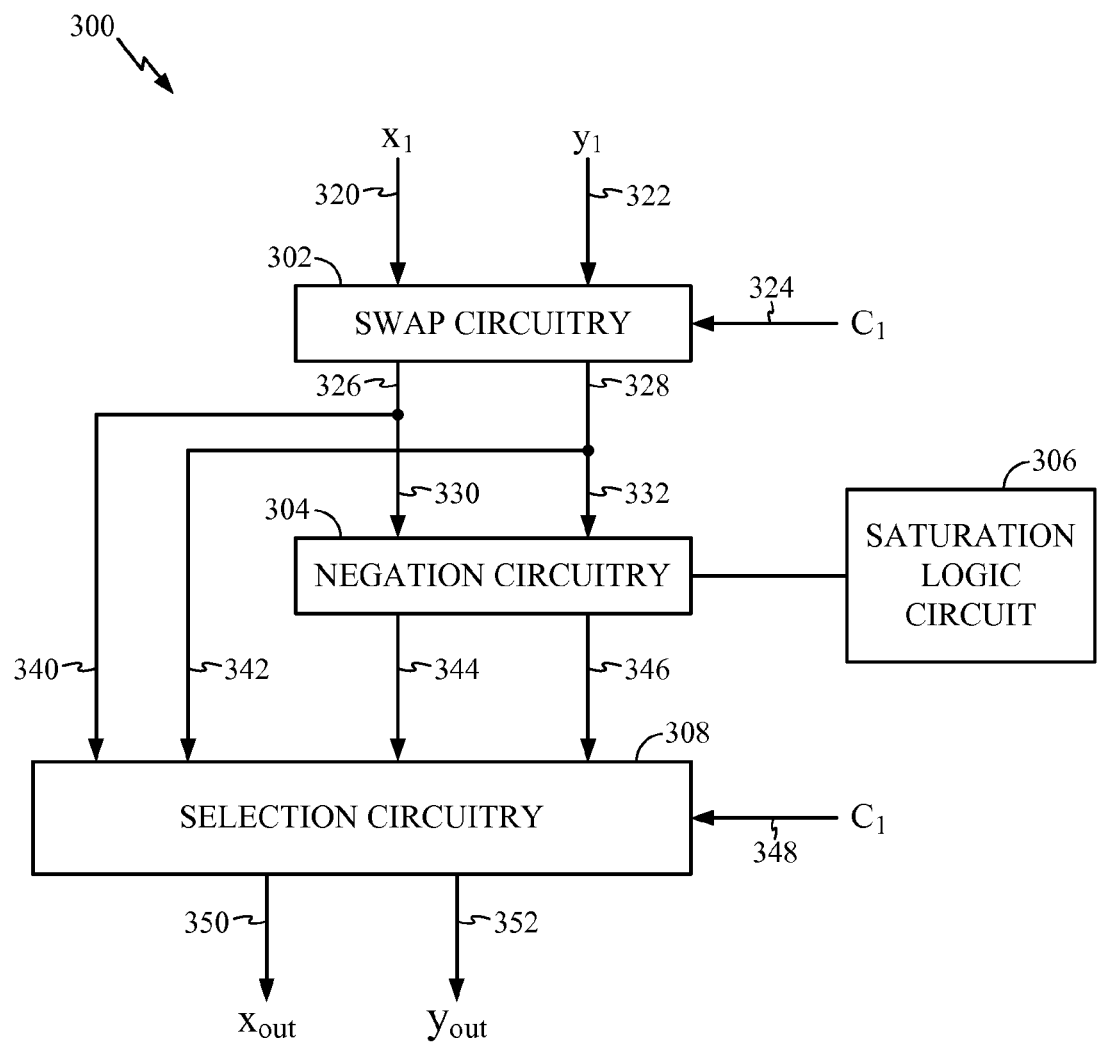
FIG. 3 is a block diagram of a first illustrative embodiment of a system to perform vector coordinate rotations.

Referring to FIG. 3, a first illustrative embodiment of a system to perform coordinate rotations is depicted and generally designated 300. The system 300 includes a means to selectively swap first coordinate data $X_1$ 320 and second coordinate data $Y_1$ 322 in response to a control value $C_1$ 324, illustrated as swap circuitry 302. The system 300 further includes means to negate the first coordinate data 320 to generate first negated coordinated data and to negate the second coordinate data 322 to generate second negated coordinated data, illustrated in FIG. 3 as negation circuitry 304. The system 300 also includes means to selectively output the first coordinate data or the first negated coordinated data and to selectively output the second coordinate data or the second negated coordinate data in response to the control value $C_1$ 348, depicted as selection circuitry 308. A saturation logic circuit 306 is coupled to the negation circuitry 304.

In a particular embodiment, the system 300 is configured to receive the first coordinate data 320 and the second coordinate data 322, and to perform a rotation of a vector that is represented by the first coordinate data 320 and the second coordinate data 322. For example, the first coordinate data 320 may represent an X coordinate of a vector, and the second coordinate data 322 may represent a Y coordinate of the vector. The control value $C_1$ 324 may represent a degree of rotation to be applied to the vector. In a particular embodiment, the control value $C_1$ indicates a multiple of a 90 degree rotation. For example, $C_1$ may be a two bit data item that may be set to a first value to indicate a 0 degree rotation, a second value to indicate a 90 degree rotation, a third value to represent a 180 degree rotation, and a fourth value to represent a 270 degree rotation. It will be recognized that due to symmetry of rotation, multiples of 90 degrees larger than 270 degrees, and multiple of 90 degrees less than 0 degrees, are equivalent to one of the multiples described herein.

In a particular embodiment, the swap circuitry 302 is configured to receive the first coordinate data 320 and the second coordinate data 322, as well as the control value 324, and to output a first swapped output 326 and a second swapped output 328. The first swapped output 326 may correspond to either the first coordinate data 320 or the second coordinate data 322, in response to the control value 324. Similarly, the second swapped output 328 may correspond to the first coordinate data 320 or the second coordinate data 322, depending upon the control value 324. The first and second swapped coordinate data outputs 326 and 328 are provided as inputs 340 and 342, respectively, to the selection circuitry 308. The first and second swap coordinate data outputs 326 and 328 are also provided as inputs 330 and 332, respectively, to the negation circuitry 304.

In a particular embodiment, the negation circuitry 304 is configured to receive the first swapped data 326 at a first input 330 and to provide a negated value of the first swapped data 326 to a first negated input 344 of the selection circuitry 308. The negation circuitry 304 is further configured to receive the second swapped data 328 at a second input 332 and to provide a negated value of the second swapped data 328 to a second negated input 346 of the selection circuitry 308. In a particular embodiment, the saturation logic circuit 306 is configured to correct an overflow condition arising from an operation of the negation circuitry 304. For example, when a "0" value is negated, in certain binary number representations, a resultant negative "0" value may be translated to an incorrect result. Therefore, the saturation logic circuit 306 is configured to detect and correct such negative saturation conditions.

In a particular embodiment, the selection circuitry 308 is configured to receive the control value $C_1$ at a control input 348 and to selectively output values at a first coordinate output $X_{out}$ 350 and a second coordinate output $Y_{out}$ 352 that correspond to the first coordinate data 320 and the second coordinate data 322 rotated by an amount indicated by the control value $C_1$. Therefore, the selection circuitry 308 may receive the first swapped output 326 at a first swap coordinate input 340 and a negated value of the first swapped output 326 at the first negated input 344. The selection circuitry 308 may selectively provide a value received at one of the first swap coordinate input 340 and the first negated input 344 to the first coordinate output $X_{out}$ 350. In addition, the selection circuitry 308 may receive a second swap coordinate input 342 and the second negated input 346 and may selectively output a value received at one of the second swap coordinate input 342 and the second negated input 346 to the second coordinate output $Y_{out}$ 352.

It will be recognized that the first coordinate output $X_{out}$ 350 and the second coordinate output $Y_{out}$ 352 represent a result of a rotation of the input vector indicated by the first coordinate data 320 and the second coordinate data 322, after the input vector is rotated by a multiple of 90 degrees that is represented by the control value $C_1$. The output from the selection circuitry 308 is generated without performing a table lookup, and further without performing a multiplication operation. Instead, the symmetries inherent to two dimensional vector rotations are exploited to generate rotations of multiples of 90 degrees using swap, negation, and selection circuitry. Thus, the system 300 provides a hardware implementation of a fast vector rotation, such as may be used in the modem 140 depicted in FIG. 1, in one or more of the execution units 270 and 272 of the processor 202 depicted in FIG. 2, in other modems or processors, or any combination thereof. For example, the system 300 may be included in a graphics processing unit. As another example, the system 300 may be included in an execution unit of a pipelined processor that is adapted to process modem applications and graphics applications.

As an example, the system 300 may be implemented in an execution unit of a multi-threaded processor. Further, the system 300 may be implemented as a part of a pipeline execution process of a pipeline processor. For example, the swap circuitry 302 may include one or more of the processor's multiplexers, crossbar devices, other switching devices or circuits, or any combination thereof. The negation circuitry 304 may include an arithmetic logic unit (ALU), an adder, other circuits or devices of the processor adapted to negate input values, or any combination thereof. The selection circuitry 308 may include one or more of the processor's multiplexers, switches, or other circuits or devices adapted to selectively output a value received at one or more inputs, or any combination thereof.

Referring to FIG. 4, a system to generate fast vector rotation operations is depicted and generally designated 400. The system 400 includes a register file 402 coupled to a crossbar 408. The crossbar 408 is coupled to provide outputs to both a vector adder 410 and to a multiplexer 412. The vector adder 410 provides outputs to the multiplexer 412. The multiplexer 412 is coupled to provide output values to an output register 414.

In a particular embodiment, the register file 402 includes a first register 404 and a second register 406. The first register 404 may include first data corresponding to a first coordinate $x_1$ 422 and a second coordinate $y_1$ 424. The first register file 404 may also include second data corresponding to a third coordinate $x_2$ 426 and a fourth coordinate $y_2$ 428. The second register 406 may store a first control value $C_1$ 430 and a second control value $C_2$ 432. In a particular embodiment, the coordinate data 422-428 in the first register 404 as well as the control values 430 and 432 in the second register 406 correspond to symbol data associated with a wireless transmission or data received at a modem, a processor, or any combination thereof.

The crossbar 408 is configured to selectively provide data received at a first input 434 to one of a first input 446 and a second input 448 of the multiplexer 412. The crossbar 408 is further configured to selectively provide data received at a second input 436 to the other one of the first input 446 and the second input 448 of the multiplexer 412. Similarly, the crossbar 408 is configured to selectively provide data received at a third input 438 to one of a third input 450 and a fourth input 452 of the multiplexer 412. The crossbar 408 is also configured to provide data received at a fourth input 440 to the other one of the third input 450 and the fourth input 452 of the multiplexer 412. In a particular embodiment, the crossbar 408 selectively determines whether to swap data values received at the first input 434 and the second input 436 corresponding to the first coordinate data $x_1$ 422 and second coordinate data $y_1$ 424. The crossbar 408 selectively swaps $x_1$ and $y_1$ based on the first control value $C_1$ 430 received at a first control input 442. The crossbar 408 is further configured to selectively swap data values received at the third input 438 and at the fourth input 440 based on a value of the second control value $C_2$ 432 that is received at a second control input 444. In a particular embodiment, the crossbar 408 operates in a substantially similar manner as the swap circuitry 302 depicted in FIG. 3.

In a particular embodiment, the vector adder 410 receives data at a first input 454 and at a second input 456 corresponding to the data provided to the first input 446 and to the second input 448 of the multiplexer 412. In addition, the vector adder 410 receives data at a third input 458 and at a fourth input 460 corresponding to the data received at the third input 450 and the fourth input 452, respectively, of the multiplexer 412. The vector adder 410 is configured to negate data received at each of the inputs 454, 456, 458, and 460. The negated data is provided to the multiplexer 412 via a first negated input 462, a second negated input 464, a third negated input 466, and a fourth negated input 468.

The multiplexer 412 is coupled to receive data $x_{1s}$, $y_{1s}$ provided by the crossbar 408 at the first input 446 and the second input 448, respectively, and to receive data $x_{2s}$ and $y_{2s}$ at the third input 450 and the fourth input 452, respectively. The multiplexer 412 is further coupled to receive negated data $-x_{1s}$ and $-y_{1s}$ from the vector adder 410 at the first negated input 462 and the second negated input 464, respectively, and to receive negated data $-x_{2s}$ and $-y_{2s}$ from the vector adder 410 at the third negated input 466 and at the fourth negated input 468, respectively. The multiplexer 412 receives the first control value $C_1$ 430 at a first control input 470 and receives the second control value $C_2$ 432 at a second control input 472.

The multiplexer 412 is configured to selectively provide a first output 474 from the first input 446 or the first negated input 462 and a second output 476 from the second input 448 or the second negated input 464 based on the first control input 470. The first output 474 and the second output 476 are coupled to provide first and second rotated coordinates $X_{1out}$ 490 and $Y_{1out}$ 492, respectively, to the output register 414. For example, where the control value $C_1$ 430 indicates a zero-degree rotation, which requires no negated values, the multiplexer 412 selects the non-negated inputs 446 and 448 to provide to the first output 474 and the second output 476, respectively. Where the control value $C_1$ 430 indicates a one hundred eighty-degree rotation, requiring negation of both coordinates, the multiplexer 412 selects the negated inputs 462 and 464 from the vector adder 410. Where the control value indicates a ninety degree rotation or a two hundred seventy degree rotation, the multiplexer may select one non-negated input 446 or 448 and one negated input 462 or 464.

The multiplexer 412 is also configured to selectively provide one of the third coordinate input 450 and the third negated input 466 to a third output 478 based on the second control input 472. The multiplexer 412 is further configured to select the fourth coordinate input 452 or the fourth negated input 468, based on the second control input 472, to a fourth output 480. The third and fourth outputs 478 and 480 are coupled to the output register 414 to provide second vector rotated output data $X_{2out}$ 494 and $Y_{2out}$ 496, respectively.

The system 400, in a particular embodiment, further includes a saturation logic circuit 411 that is coupled to the vector adder 410. The saturation logic circuit 411 may be configured to detect a saturation condition at an output of the vector adder 410, such as may be caused by a negation of a "zero" value in a two's complement binary representation, and to provide a corrected value for output at the vector adder 410. In a particular embodiment, the saturation logic circuit 411 may include one or more exclusive-OR gates, and may provide one or more hardwired values to be swapped into the vector adder 410.

In a particular embodiment, the system 400 may be implemented at a portion of a processor pipeline, such as at an execution unit of an interleaved multithreaded processor. For example, the crossbar 408 may be part of a routing unit to align data at an execution unit of a processor, and the vector adder 410 and multiplexer 412 may also be elements within the execution unit. In another particular embodiment, the system 400 may be implemented in a modem of a wireless device, such as the modem 140 of FIG. 1. In a particular implementation, the system 400 may be implemented at one or more execution units of a pipelined interleaved multi-threaded processor to perform modem operations. Furthermore, in an illustrative embodiment, the crossbar 408 may correspond to a specific implementation of the swap circuitry 320, the vector adder 410 may correspond to a specific implementation of the negation circuitry 304, and the multiplexer 412 may serve as a specific implementation of the selection circuitry 308, as depicted in FIG. 3, and further adapted to perform concurrent rotations of multiple vectors, as indicated by the first vector having coordinates corresponding to the first data 422 and 424 and the second vector having coordinates corresponding to the second data 426 and 428.

Figure 5:
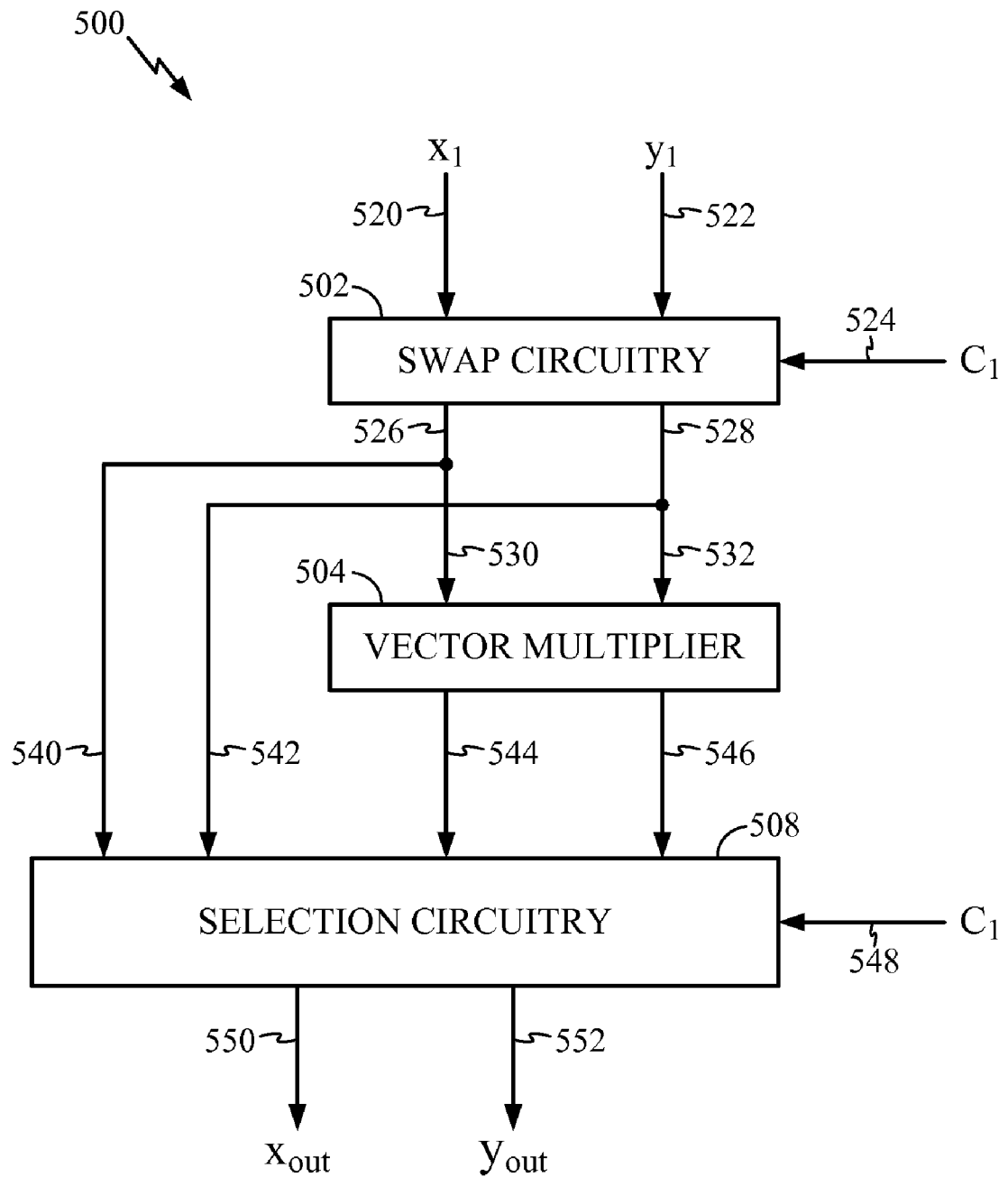
FIG. 5 is a block diagram of a second illustrative embodiment of a system to perform vector coordinate rotations.

Referring to FIG. 5, a second illustrative embodiment of a system to perform coordinate rotations is depicted and generally designated 500. The system 500 includes means to selectively swap first coordinate data $X_1$ 520 and second coordinate data $Y_1$ 522 in response to a control value $C_1$ 524, illustrated as swap circuitry 502. The system 500 further includes means to negate the first coordinate data 520 to generate first negated coordinated data and to negate the second coordinate data 522 to generate second negated coordinated data, illustrated in FIG. 5 as a vector multiplier 504. The system 500 also includes means to selectively output the first coordinate data or the first negated coordinated data and to selectively output the second coordinate data or the second negated coordinate data in response to the control value $C_1$ 548, depicted as selection circuitry 508. The system 500 generally corresponds to and operates in accordance with the system 300 of FIG. 3 using the vector multiplier 504 in place of the negation circuitry 304.

In a particular embodiment, the system 500 is configured to receive the first coordinate data 520 and the second coordinate data 522, and to perform a rotation of a vector that is represented by the first coordinate data 520 and the second coordinate data 522. For example, the first coordinate data 520 may represent an X coordinate of a vector, and the second coordinate data 522 may represent a Y coordinate of the vector. The control value $C_1$ 524 may represent a degree of rotation to be applied to the vector.

In a particular embodiment, the swap circuitry 502 is configured to receive the first coordinate data 520 and the second coordinate data 522, as well as the control value 524, and to output a first swapped output 526 and a second swapped output 528. The first and second swapped coordinate data outputs 526 and 528 are provided as inputs 540 and 542, respectively, to the selection circuitry 508. The first and second swap coordinate data outputs 526 and 528 are also provided as inputs 530 and 532, respectively, to the vector multiplier 504.

In a particular embodiment, the vector multiplier 504 is configured to receive the first swapped data 526 at a first input 530 and to provide a negated value of the first swapped data 526 to a first negated input 544 of the selection circuitry 508. The vector multiplier 504 is further configured to receive the second swapped data 528 at a second input 532 and to provide a negated value of the second swapped data 528 to a second negated input 546 of the selection circuitry 508. In a particular embodiment, the vector multiplier 504 includes control logic to selectively multiply data received at the first input 530, the second input 532, or both, by negative one.

In a particular embodiment, the selection circuitry 508 is configured to receive the control value $C_1$ at a control input 548 and to selectively output values at a first coordinate output $X_{out}$ 550 and a second coordinate output $Y_{out}$ 552 that correspond to the first coordinate data 520 and the second coordinate data 522 rotated by an amount indicated by the control value $C_1$. Therefore, the selection circuitry 508 may receive the first swapped output 526 at a first swap coordinate input 540 and a negated value of the first swapped output 526 at the first negated input 544. The selection circuitry 508 may selectively provide a value received at one of the first swap coordinate input 540 and the first negated input 544 to the first coordinate output $X_{out}$ 550. In addition, the selection circuitry 508 may receive a second swap coordinate input 542 and the second negated input 546 and may selectively output a value received at one of the second swap coordinate input 542 and the second negated input 546 to the second coordinate output $Y_{out}$ 552.

Figure 6:
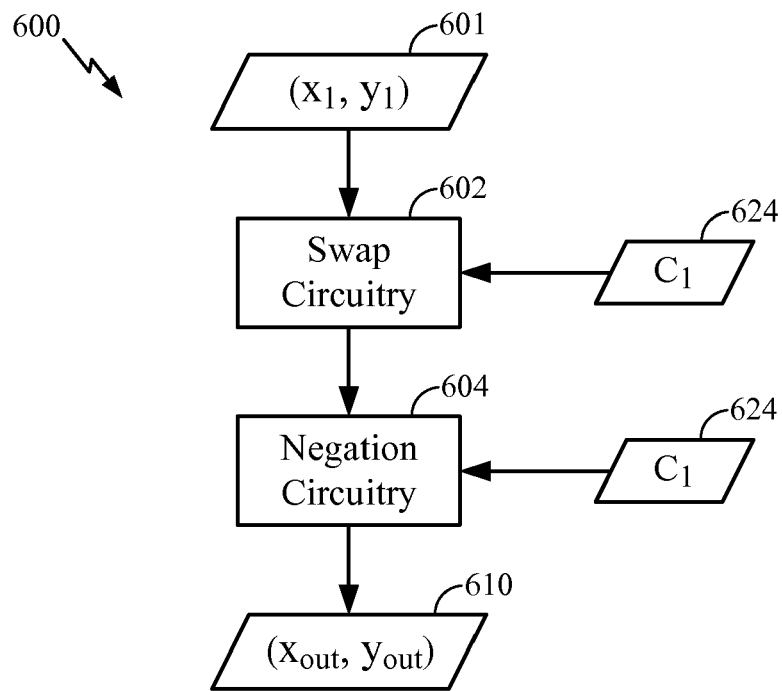
FIG. 6 is a data flow diagram of a first illustrative embodiment of a vector coordinate rotation system.

Referring to FIG. 6 a data flow of a first illustrative embodiment of a vector coordinate rotation system is depicted and generally designated 600. Swap circuitry 602 is coupled to receive an input vector $(x_1, y_1)$ 601 and to provide an output to negation circuitry 604. The swap circuitry 602 may selectively swap coordinates of the input vector 601 in response to a control value $C_1$ 624 to generate output vectors $(x_1, y_1)$ or $(y_1, x_1)$.

The negation circuitry 604 is responsive to the control value $C_1$ 624 to selectively negate data received from the swap circuitry 602 and to generate an output vector $(x_{out}, y_{out})$ 610. For example, the negation circuitry 604 may receive a first vector coordinate and a second vector coordinate, and may selectively negate the first coordinate only, the second coordinate only, both coordinates, or neither coordinate, based on the control value $C_1$ 624. The output vector 610 corresponds to the input vector 601 after being rotated about a coordinate origin by a multiple of ninety degrees that is indicated by the control value $C_1$ 624. Because the negation circuitry 604 is responsive to the control value $C_1$ 624 to selectively negate received data, the system 600 is operative to perform vector coordinate rotation operations without output selection circuitry, such as the selection circuitry 308 of FIG. 3.

In a particular embodiment, the system 600 represents a processor programmed to implement a fast vector rotation algorithm that includes selectively swapping first and second coordinates when a rotation amount is ninety degrees or two hundred seventy degrees, followed by selectively negating the first coordinate when the rotation amount is ninety degrees, selectively negating the second coordinate when the rotation amount is two hundred seventy degrees, and selectively negating both coordinates when the rotation amount is one hundred eighty degrees. The swap circuitry 602 may be implemented using a crossbar device, a multiplexer device, another device configured to selectively swap two or more input values, a swap operation that is executed at a processor execution unit, firmware, hardware, or any combination thereof. The negation circuitry 604 may be implemented using a vector adder, a vector multiplier, another device configured to selectively negate two or more input values, a negation operation that is executed at a processor execution unit, firmware, hardware, or any combination thereof.

Figure 7:
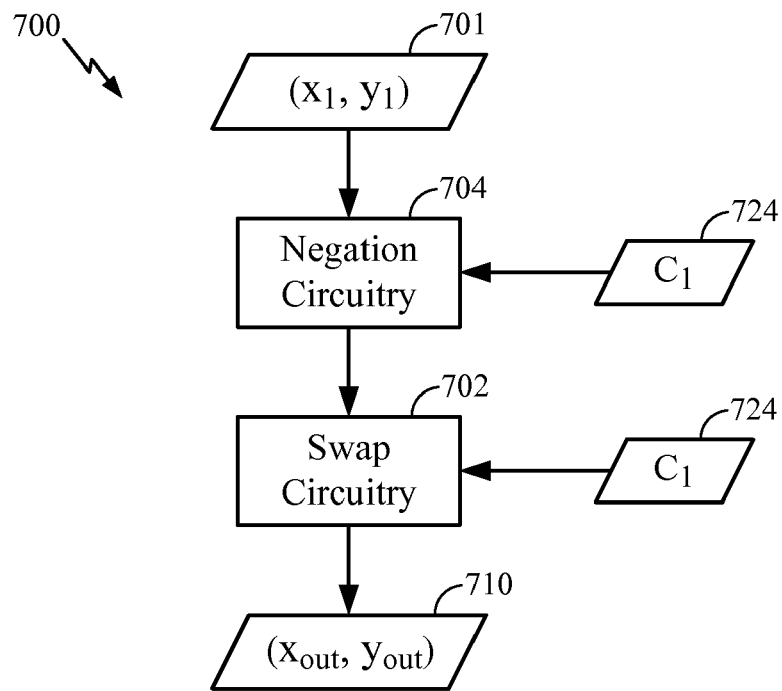
FIG. 7 is a data flow diagram of a second illustrative embodiment of a vector coordinate rotation system.

Referring to FIG. 7 a data flow of a second illustrative embodiment of a vector coordinate rotation system is depicted and generally designated 700. Negation circuitry 704 is coupled to receive an input vector $(x_1, y_1)$ 701 and to provide an output to swap circuitry 702. The negation circuitry 704 may selectively negate coordinates of the input vector 701 in response to a control value $C_1$ 724 to generate output vectors $(x_1, y_1)$, $(x_1, -y_1)$, $(-x_1, y_1)$, or $(-x_1, -y_1)$.

The swap circuitry 702 is responsive to the control value $C_1$ 724 to selectively swap data received from the negation circuitry 704 and to generate an output vector $(x_{out}, y_{out})$ 710. The output vector 710 corresponds to the input vector 701 after being rotated about a coordinate origin by a multiple of ninety degrees as indicated by the control value $C_1$ 724.

In a particular embodiment, the system 700 represents a processor programmed to implement a fast vector rotation algorithm that includes receiving a first and second coordinate, selectively negating the second coordinate when a rotation amount is ninety degrees, selectively negating the first and second coordinates when the rotation amount is one hundred eighty degrees, selectively negating the first coordinate when the rotation amount is two hundred seventy degrees, and then selectively swapping both coordinates when the rotation amount is ninety degrees or two hundred seventy degrees. The swap circuitry 702 may be implemented using a crossbar device, a multiplexer device, another device configured to selectively swap two or more input values, a swap operation that is executed at a processor execution unit, firmware, hardware, or any combination thereof. The negation circuitry 704 may be implemented using a vector adder, a vector multiplier, another device configured to selectively negate two or more input values, a negation operation that is executed at a processor execution unit, firmware, hardware, or any combination thereof.

Figure 8:
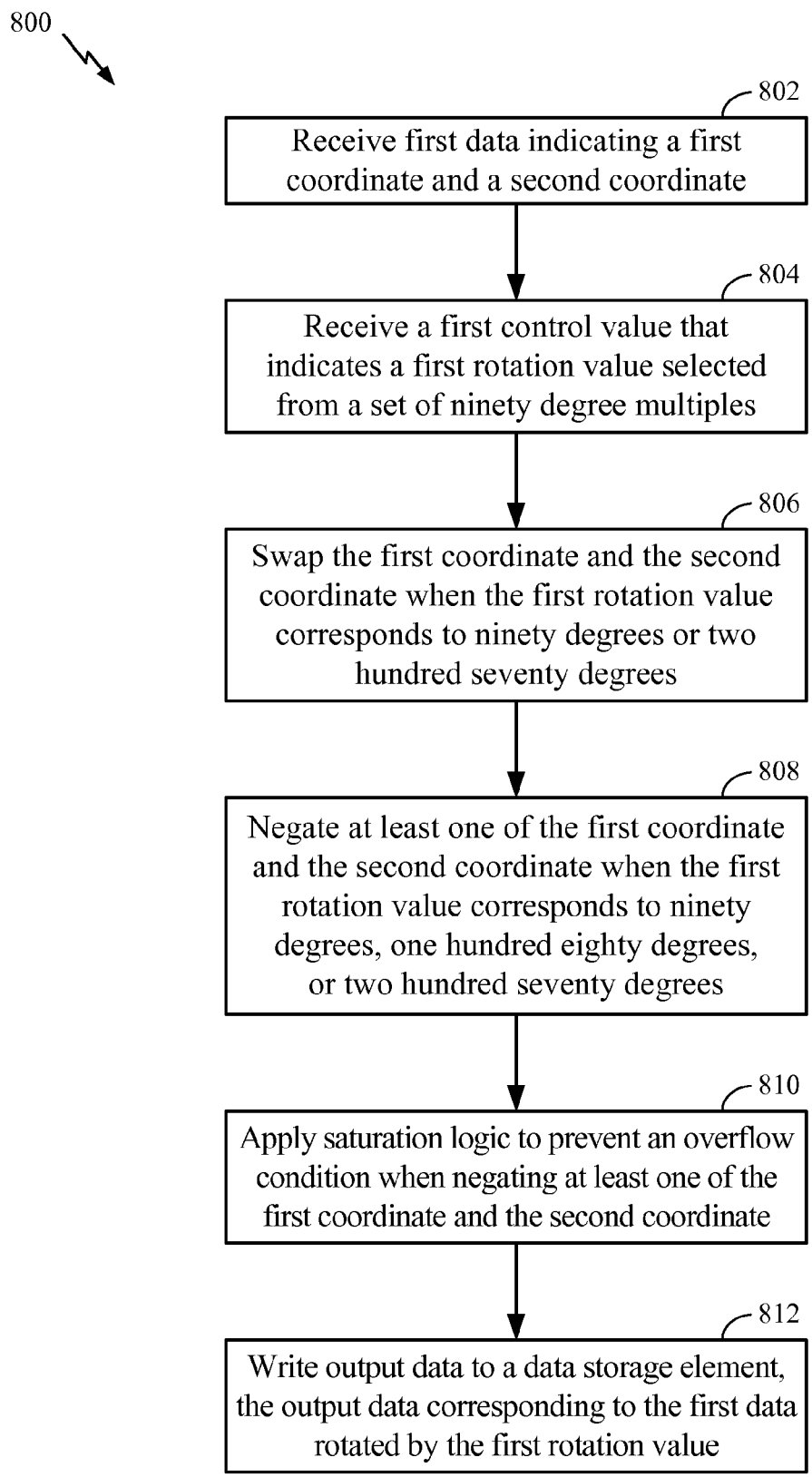
FIG. 8 is a flow chart of a first illustrative embodiment of a method to perform a fast vector rotation operation.

Referring to FIG. 8, a first illustrative embodiment of a method to perform a fast rotation operation is depicted and generally designated 800. The method 800 includes executing a single instruction at a processor. In a particular embodiment, the method may be performed at one or more of the systems depicted in FIGS. 1-7.

Executing the single instruction includes receiving first data indicating a first coordinate and a second coordinate, at 802. In a particular embodiment, the first coordinate and the second coordinate identify X and Y components of a vector. Moving to 804, a first control value is received that indicates a first rotation value selected from a set of ninety degree multiples. In a particular embodiment, the set of ninety degree multiples includes zero degrees, ninety degrees, one hundred eighty degrees, and two hundred seventy degrees.

Continuing to 806, in a particular embodiment, executing the single instruction further includes swapping the first coordinate and the second coordinate when the first rotation value corresponds to ninety degrees or two hundred seventy degrees. Advancing to 808, at least one of the first coordinate and the second coordinate is negated when the first rotation value corresponds to ninety degrees, one hundred eighty degrees, or two hundred seventy degrees.

Proceeding to 810, in a particular embodiment, saturation logic is applied to prevent an overflow condition when negating the first coordinate or the second coordinate. Moving to 812, output data is written to a data storage element. For example, the data storage element may include one or more latches, flip-flop devices, registers, caches, memories, or any other device or system to store data. The output data corresponds to the first data rotated by the first rotation value. For example, the first data may identify a vector extending from a coordinate origin to an endpoint at the first and second coordinates, and the output data may identify the endpoint of the vector after a rotation about the coordinate origin by an amount indicated by the first rotation value. In a particular embodiment, the output data is determined without performing a multiplication operation or a table lookup, enabling a lower power and higher speed operation than by using a multiplication operation or a table lookup.

The single rotate instruction may be executed in a single execution cycle of a processor. For example, the single rotate instruction may be executed at a processor that includes an execution unit that implements the system 400 of FIG. 4 to perform vector rotation operations in a single execution cycle.

In a particular embodiment, the first control value may correspond to a symbol value of a received wireless signal. For example, each symbol value of a wireless signal may represent an angular offset from an accumulated phase, and the first control value may indicate a degree of rotation required to adjust a vector based on the accumulated phase to determine the angular offset associated with the symbol. In a particular embodiment, executing the single rotate instruction may be performed in connection with a quadrature decode cycle of a wireless receiver. For example, where received wireless data has an in-phase component (I) and a quadrature component (Q) that is ninety degrees out of phase with the in-phase component, the quadrature component may be rotated by a multiple of ninety degrees for decoding with the in-phase component.

In a particular embodiment, the single instruction is a micro-instruction. For example, in a micro-code processor that is adapted to translate a received instruction into one or more executable micro-instructions, the single instruction may be a micro-instruction, i.e., an instruction that is directly executable and that is not translatable into multiple other executable instructions. In another embodiment, the single instruction may be executed at a non-microcode processor, i.e., at a processor that executes received instructions without first translating the instructions into multiple executable micro-instructions. In an embodiment, the single instruction may be executed at a pipeline that does not support microcode, where the pipeline determines the vector rotation output as a single pipeline operation without performing a sequence of sub-operations corresponding to micro-instructions.

Figure 9:
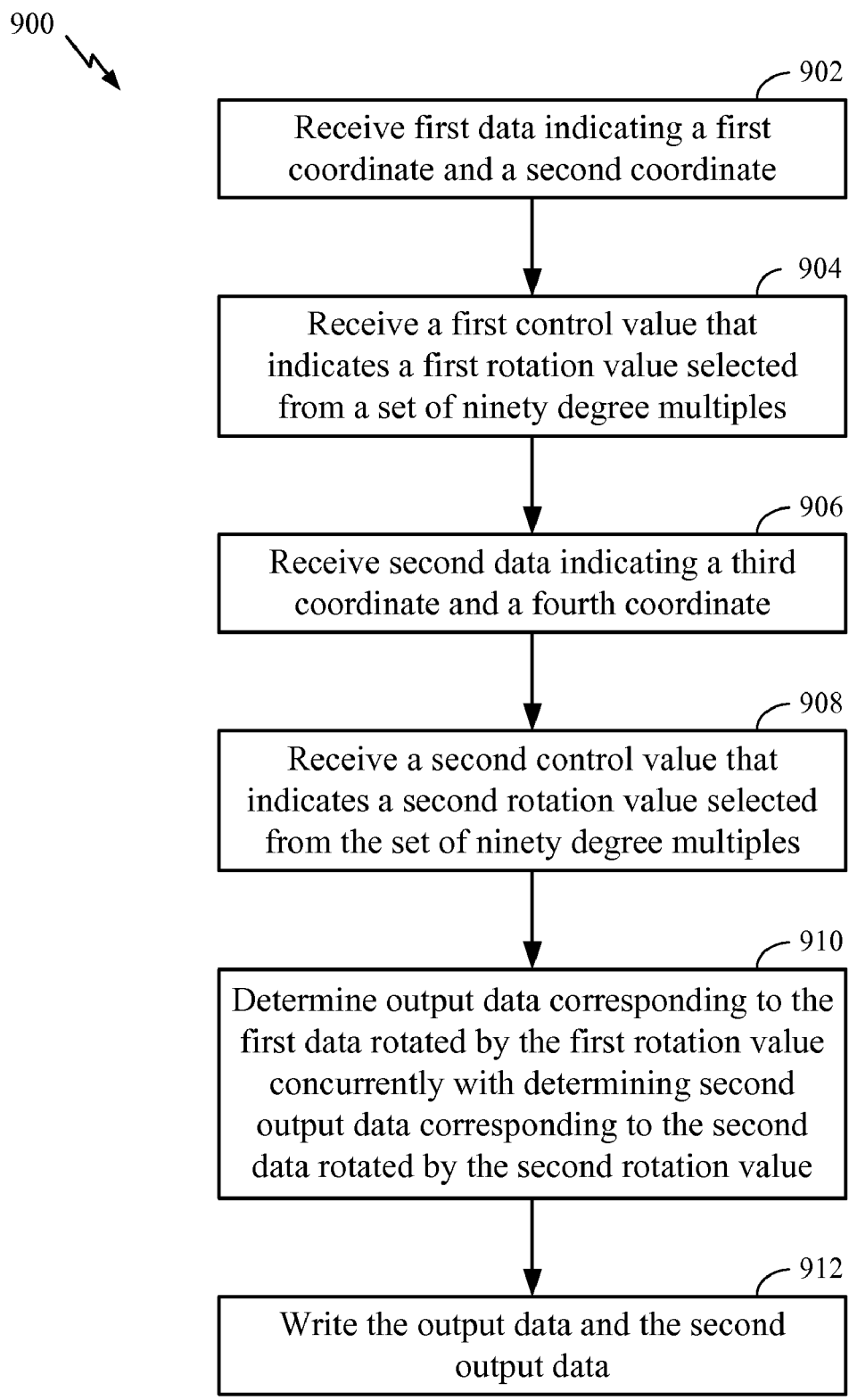
FIG. 9 is a flow chart of a second illustrative embodiment of a method to perform a fast vector rotation operation.

Referring to FIG. 9, a second illustrative embodiment of a method to perform a fast rotation operation is depicted and generally designated 900. The method 900 may be performed at one or more of the systems depicted in FIGS. 1-7, or in accordance with the method 800 depicted in FIG. 8, or any combination thereof.

The method 900 includes executing a single instruction, which includes receiving first data indicating a first coordinate and a second coordinate, at 902. Moving to 904, a first control value is received that indicates a first rotation value selected from a set of ninety degree multiples. In a particular embodiment, the set of ninety degree multiples includes zero degrees, ninety degrees, one hundred eighty degrees, and two hundred seventy degrees.

In a particular embodiment, executing the single instruction also includes receiving second data indicating a third coordinate and a fourth coordinate, at 906. A second control value that indicates a second rotation value selected from the set of ninety degree multiples may be received, at 908. Output data corresponding to the first data rotated by the first rotation value may be determined concurrently with determining second output data corresponding to the second data rotated by the second rotation value. The output data and the second output data may be written to a data storage element, at 912.

In a particular embodiment, the output data and the second output data may be determined at a single execution unit of a processor before either of the output data or the second output data is written to a register file. For example, the second output data may be determined concurrently with determining the output data, as described with respect to the system 200 of FIG. 2. In an illustrative embodiment, the execution unit of the processor includes the system 400 of FIG. 4, and the crossbar 408, the vector adder 410, and the multiplexer 412 may operate on the first input data and the second input data in parallel, and the output data and the second output data may be written to the output register 414 substantially concurrently.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
executing a single instruction at a processor, wherein executing the single instruction includes:
receiving first data and second data, wherein the first data comprises a first coordinate and a second coordinate, and wherein the second data comprises a third coordinate and a fourth coordinate;
receiving a first control value and a second control value, wherein the first control value indicates a first rotation value selected from a set of ninety degree multiples and the second control value indicates a second rotation value selected from the set of ninety degree multiples; and
determining first output data and second output data during a single execution cycle at a single execution unit of the processor, wherein the single execution unit includes vector adder circuitry configurable to perform an add operation, wherein determining the first output data and the second output data includes the vector adder circuitry performing a negation operation, and wherein the first output data corresponds to the first data rotated by the first control value and the second output data corresponds to the second data rotated by the second control value.

2. The method of claim 1, wherein determining the first output data and the second output data is performed without a multiplication operation and without a table lookup.

3. The method of claim 1, wherein the set of ninety degree multiples includes zero degrees, ninety degrees, one hundred eighty degrees, and two hundred seventy degrees, and wherein executing the single instruction further comprises:

swapping the first coordinate and the second coordinate when the first control value corresponds to ninety degrees or two hundred seventy degrees; and negating at least one of the first coordinate and the second coordinate when the first control value corresponds to ninety degrees, one hundred eighty degrees, or two hundred seventy degrees.

4. The method of claim 3, wherein executing the single instruction further comprises applying saturation logic to prevent an overflow condition when negating at least one of the first coordinate and the second coordinate.

5. The method of claim 1, wherein the first control value corresponds to a symbol value of a received wireless signal.

6. The method of claim 1, wherein the single instruction is executed in a pipeline that does not support microcode.

7. The method of claim 1, wherein executing the single instruction further comprises writing the first output data and the second output data to a data storage element.

8. The method of claim 1, wherein the first data and the second data correspond to symbol phase data associated with a wireless signal received from an antenna, and wherein the first coordinate and the second coordinate correspond to a first coordinate pair, and wherein the third coordinate and the fourth coordinate correspond to a second coordinate pair.

9. The method of claim 1, wherein determining the first output data and the second output data is performed concurrently.

10. The method of claim 1, wherein the single execution unit includes a single crossbar configured to provide the first coordinate, the second coordinate, the third coordinate, and the fourth coordinate to at least one multiplexer of the single execution unit during the single execution cycle.

11. The method of claim 10, wherein the single crossbar receives the first coordinate, the second coordinate, the third coordinate, and the fourth coordinate from a single register file.

12. The method of claim 1, wherein the processor is a digital signal processor.

13. A non-transitory processor-readable medium having processor-executable instructions that are executable to cause a processor to:

receive first data and second data, wherein the first data comprises a first coordinate and a second coordinate, and wherein the second data comprises a third coordinate and a fourth coordinate;

receive a first control value and a second control value, wherein the first control value indicates a first amount to rotate the first data, and wherein the second control value indicates a second amount to rotate the second data; and determine first output data and second output data during a single execution cycle at a single execution unit of the processor, wherein the first output data and the second output data are determined via receipt of the first control value and the second control value at control inputs of a multiplexer of the single execution unit to control selection of one or more input values and one or more negated input values that are generated by a vector adder circuit of the single execution unit, wherein the one or more input values and the one or more negated input values are used to determine the first output data and the second output data, and wherein the first output data corresponds to the first data rotated by the first control value and the second output data corresponds to the second data rotated by the second control value.

14. The non-transitory processor-readable medium of claim 13, wherein the first amount to rotate the first data and the second amount to rotate the second data are each selected from a set of ninety degree multiples.

15. The non-transitory processor-readable medium of claim 13, further comprising processor-executable instructions that are executable to cause the processor to store the first output data and the second output data into a memory.

16. The non-transitory processor-readable medium of claim 13, wherein the first coordinate, the second coordinate, the third coordinate, and the fourth coordinate are each associated with symbol phase data corresponding to a wireless signal.

17. A processor comprising:

means for receiving first data and second data, wherein the first data comprises a first coordinate and a second coordinate, and wherein the second data comprises a third coordinate and a fourth coordinate;

means for-receiving a first control value and a second control value, wherein the first control value indicates a first rotation value selected from a set of ninety degree multiples and the second control value indicates a second rotation value selected from the set of ninety degree multiples; and means for determining first output data and second output data during a single execution cycle at a single execution unit of the processor, wherein the means for determining includes a vector adder integrated in the single execution unit and configurable to perform one or more operations on values inputted into a multiplexer of the single execution unit, wherein the values are used to determine the first output data and the second output data, and wherein the first output data corresponds to the first data rotated by the first control value and the second output data corresponds to the second data rotated by the second control value.

18. The processor of claim 17, wherein the means for determining the first output data includes a crossbar device configured to selectively switch the first coordinate and the second coordinate.

19. The processor of claim 17, wherein the vector adder is configured to negate at least one of the first coordinate and the second coordinate.

20. The processor of claim 19, further comprising a saturation logic circuit to correct a negative overflow condition at the vector adder.

21. The processor of claim 17, further comprising means for outputting the first output data and the second output data to a memory.

22. The processor of claim 21, wherein the means for outputting the first output data and the second output data to a memory includes a multiplexer.

23. A system comprising:

a transceiver configured to be coupled to an antenna; and a modem configured to:

receive wireless signal data from the transceiver, the wireless signal data comprising:

first data and second data, wherein the first data comprises a first coordinate and a second coordinate, and wherein the second data comprise a third coordinate and a fourth coordinate; and a first control value and a second control value, wherein the first control value indicates a first rotation value selected from a set of ninety degree multiples and the second control value indicates a second rotation value selected from the set of ninety degree multiples; and determine first output data and second output data during a single execution cycle at a single execution unit of a processor, wherein the single execution unit includes a vector adder that is configured to perform a negation operation, and wherein the first output data corresponds to the first data rotated by the first control value and the second output data corresponds to the second data rotated by the second control value.

24. The system of claim 23, wherein the execution unit comprises a crossbar device configured to selectively swap the first coordinate and the second coordinate in response to the first control value.

25. The system of claim 24, wherein the vector adder is configured to negate an output of the crossbar device in response to the first control value.

26. The system of claim 25, wherein the execution unit further comprises a multiplexer coupled to selectively output either an output of the vector adder or the output of the crossbar device in response to the first control value.

* * * * *